July 14, 1936.   L. HOPP   2,047,632
PRICE TICKET HOLDER
Filed Jan. 10, 1936
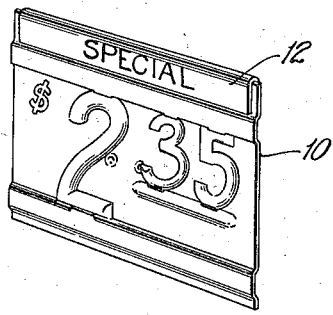
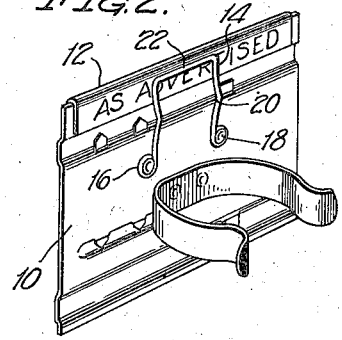
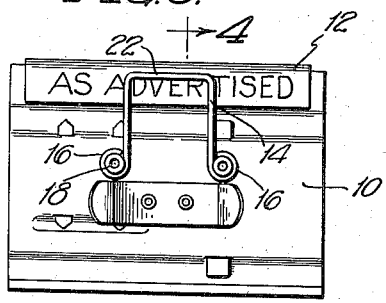
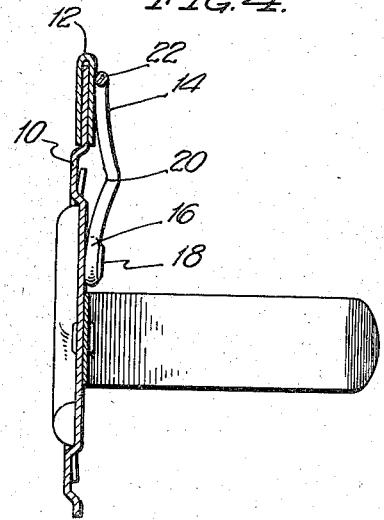
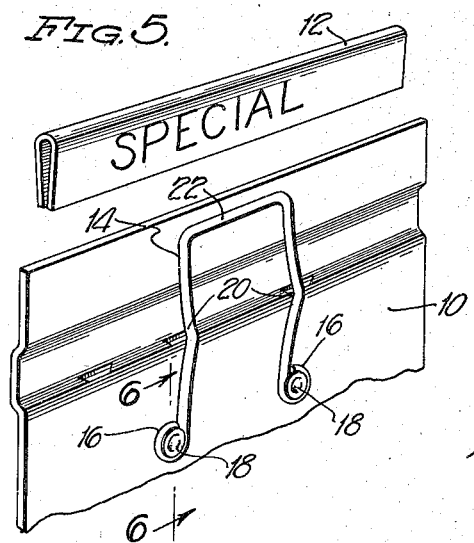
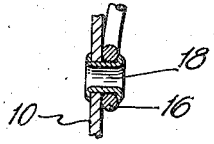
LEO HOPP,
INVENTOR
BY Ely Pattison
ATTORNEYS.

Patented July 14, 1936

2,047,632

UNITED STATES PATENT OFFICE 2,047,632

PRICE TICKET HOLDER

Leo Hopp, New York, N. Y., assignor to The Hopp Press, Inc., New York, N. Y., a corporation of New York Application January 10, 1936, Serial No. 58,484

6 Claims. (Cl. 40—11)

This invention relates to new and useful improvements in display devices and more particularly it pertains to such devices commonly known in the art as price ticket holders.

It is one object of the present invention to provide a new and improved price ticket holder which may be used in connection with various merchandise thus eliminating the necessity of having a large number of price ticket holders adequately to cover a large variety of merchandise.

A feature of the invention resides in the provision of a main body portion with which a price ticket or a plurality of price tickets may be used and in the association therewith of an indicia bearing member which is both reversible and removable with respect to the main body portion.

A further feature of the invention resides in the provision of means to hold the indicia carrying member against movement or accidental displacement relative to the main body portion of the price ticket holder.

Other features of the invention will become apparent as the nature of the invention is better understood and reference will now be had to the accompanying drawing forming a part of this application.

In the drawing,

Figure 1 is a front perspective view of a price ticket holder constructed in accordance with the present invention, Figure 2 is a rear perspective view thereof, Figure 3 is a rear elevation thereof, Figure 4 is a transverse sectional view on an enlarged scale taken substantially on the line 4—4 of Figure 3, Figure 5 is a detail distended rear perspective view on an enlarged scale, and;

Figure 6 is a detail sectional view taken substantially on the line 6—6 of Figure 5.

Referring to the drawing by reference numerals, 10 designates the main body portion of the price ticket holder. This main body portion is constructed from relatively thin material which is rigid or semi-rigid in character. It may be of any of the well known types of price ticket holders, but preferably it is of the type in which the characters which form the various prices are removably associated therewith.

In order that the device may be used with various articles of merchandise, or to convey to a prospective purchaser a special message, I associate with the main body portion of the price ticket holder, a member which is both removable and reversible with relation to the main body portion.

In the present embodiment of the invention, this member is designated 12. It is of U-shape cross sectional form and is adapted to embrace one of the free edges of the main body portion 10 of the price ticket holder, as best illustrated in Figure 4. This member 12 bears suitable indicia of which "Special", "As advertised", "As shown" are good examples, or it may bear other indicia identifying a particular commodity. In any event, the member 12 is adapted to frictionally engage the main body portion closely adjacent the edge which it embraces and on both faces of said body portion, in order that the member 12 may be held in position relative to the said body portion. The member 12, in order that this holding frictional engagement may be had, is preferably formed of flexible or resilient material, of which celluloid is one very good example, and which has been found to very satisfactorily answer the purpose.

I prefer, however, to provide means for insuring against movement of the member 12 relative to the main body portion 10 of the price ticket holder, which means will also prevent accidental displacement of the member 12 relative to the main body portion 10 and which will permit of its being removed for the purpose of reversal or replacement as desired.

In the present embodiment of the invention, this holding means is illustrated as a spring member 14 which is of inverted U form and preferably formed from wire. On the free end of each of the legs of this member, there is formed an eye or loop 16, and rivets 18, preferably the hollow type, pass through these eyes or loops 16 to secure the holding spring 14 to the main body portion 10. The legs of the holding spring 14 may be bent as at 20 to produce a resiliency therein, and to cause the portion 22 which connects the legs of the spring to exert a slight pressure where it engages the face of the main body portion. This pressure will be sufficient to hold the member 12 against movement or accidental displacement relative to the main body portion 10 when the member 12 is placed upon the edge of the main body portion, as illustrated in Figure 4. The member 12 being formed of flexible or resilient material, as heretofore stated, will be pressed into engagement with the main body portion of the price ticket holder by the portion 22 of the holding spring 14, and this frictional engagement will be sufficient for the purpose intended.

When it is desired to reverse or remove the member 12, it is only necessary to grasp the same with one hand holding the price ticket holder with the other and slide the same relative to the price ticket holder until it is free of the holding spring 14. In inserting a member 12 it is only necessary to engage the edge of the price ticket holder between the flanges of the member 12 and force one of the flanges downwardly behind the member 22 of the holding spring 14.

From the foregoing it will be apparent that the present invention provides a new and improved price ticket holder in which means is provided whereby the price ticket holder may be employed in connection with commodities or merchandise of various characters, thus rendering one device capable of use in many connections.

While the invention has been illustrated in its preferred form, it is to be understood that it is not to be restricted to the specific construction shown and that it may be illustrated in other forms without departing from the spirit thereof.

Having thus described the invention, what is claimed as new, is:

1. A price ticket holder comprising in combination, a main body portion, ticket holding means carried by said body portion, an indicia carrying member embracing one edge of the main body portion and having frictional engagement therewith, and resilient means carried by the main body portion and engaging said indicia carrying member for retaining it in position upon the edge of the main body portion.

2. A price ticket holder comprising in combination, a main body portion of relatively thin rigid material, ticket holding means carried by the body portion, an indicia carrying member, U-shaped in cross-section, said indicia carrying member embracing one edge of the main body portion and slidable thereon, and a spring carried by the main body portion and extending into engagement with the indicia carrying member and exerting a holding pressure thereon to hold it against movement relatively to the main body portion.

3. A price ticket holder comprising in combination, a rigid main body portion and an indicia carrying member, ticket holding means carried by the body portion, said indicia carrying member being U-shaped in cross-sectional form and formed from flexible material, said indicia carrying member being adapted to embrace one edge of the main body portion, and resilient means carried by the main body portion and engaging the indicia carrying member to flex the same into holding engagement with the main body portion.

4. A price ticket holder comprising in combination, a rigid main body portion and an indicia carrying member, ticket holding means carried by the body portion, said indicia carrying member being U-shaped in cross-sectional form and formed from flexible material, said indicia carrying member being adapted to embrace one edge of the main body portion, and means carried by the main body portion and engaging the indicia carrying member to flex the same into holding engagement with the main body portion, said last means comprising a spring rigidly secured to the main body portion and having a free portion overlying the indicia carrying member.

5. A price ticket holder comprising in combination, a rigid main body portion and an indicia carrying member, ticket holding means carried by the body portion, said indicia carrying member being U-shaped in cross-sectional form and formed from flexible material, said indicia carrying member being adapted to embrace one edge of the main body portion, and means carried by the main body portion and engaging the indicia carrying member to flex the same into holding engagement with the main body portion, said last mentioned means comprising an inverted U-shaped spring, and means securing the free ends of the legs of said spring to the main body portion with the portion connecting said legs in engagement with the indicia carrying member.

6. A price ticket holder comprising in combination, a rigid main body portion and an indicia carrying member, ticket holding means carried by the body portion, said indicia carrying member being U-shaped in cross sectional form and formed from flexible material, said indicia carrying member being adapted to embrace one edge of the main body portion, and means carried by the main body portion and engaging the indicia carrying member to flex the same into holding engagement with the main body portion, said last mentioned means comprising an inverted U-shaped spring, a bent portion intermediate the ends of each of the legs of said inverted U-shaped spring, an eye or loop formed in the free end of each of the legs of the inverted U-shaped member, and means passing through said eyes or loops for securing the spring to the main body portion with the portion connecting its legs, in engagement with the indicia carrying member.

LEO HOPP.